United States Patent Office 3,485,276
Patented Dec. 23, 1969

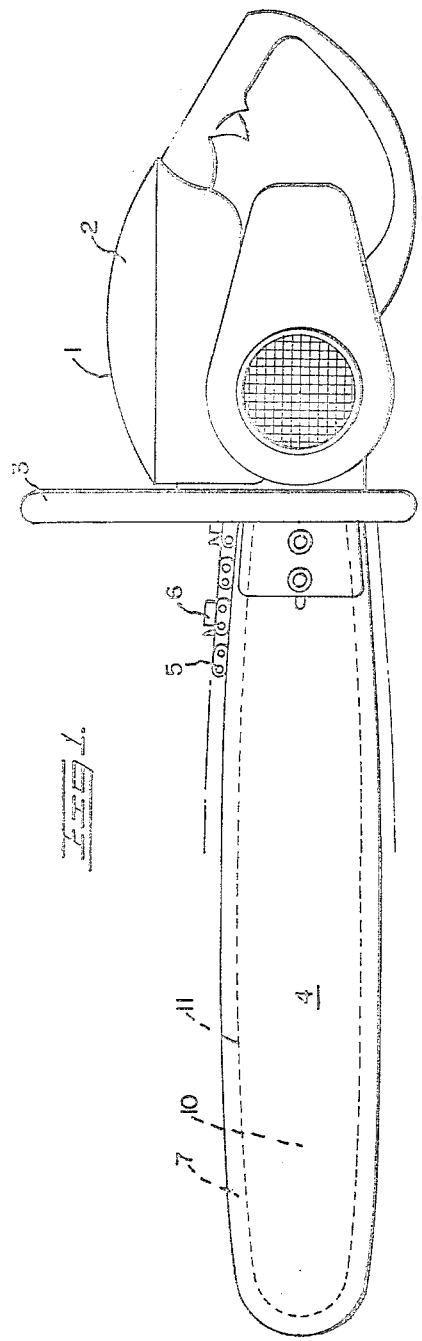
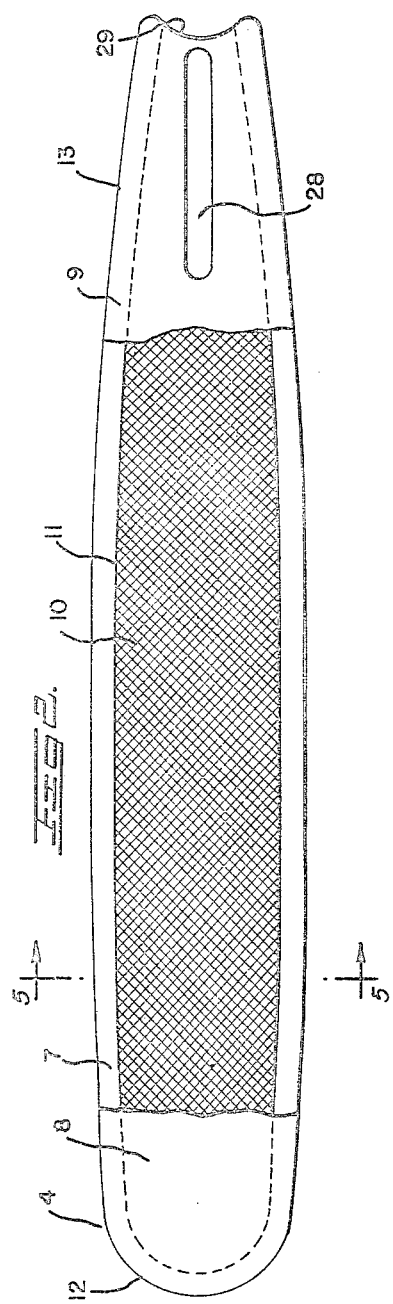

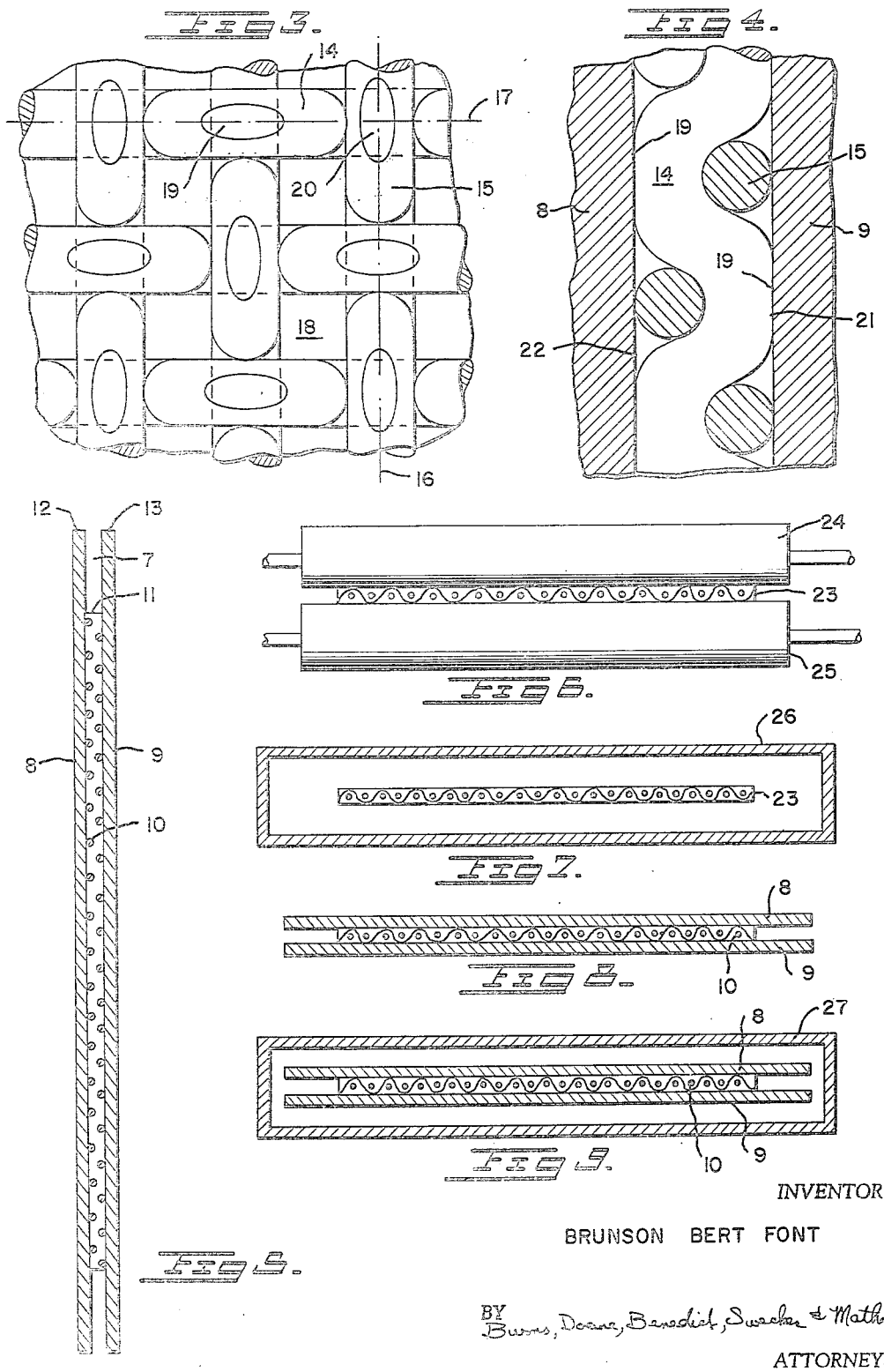

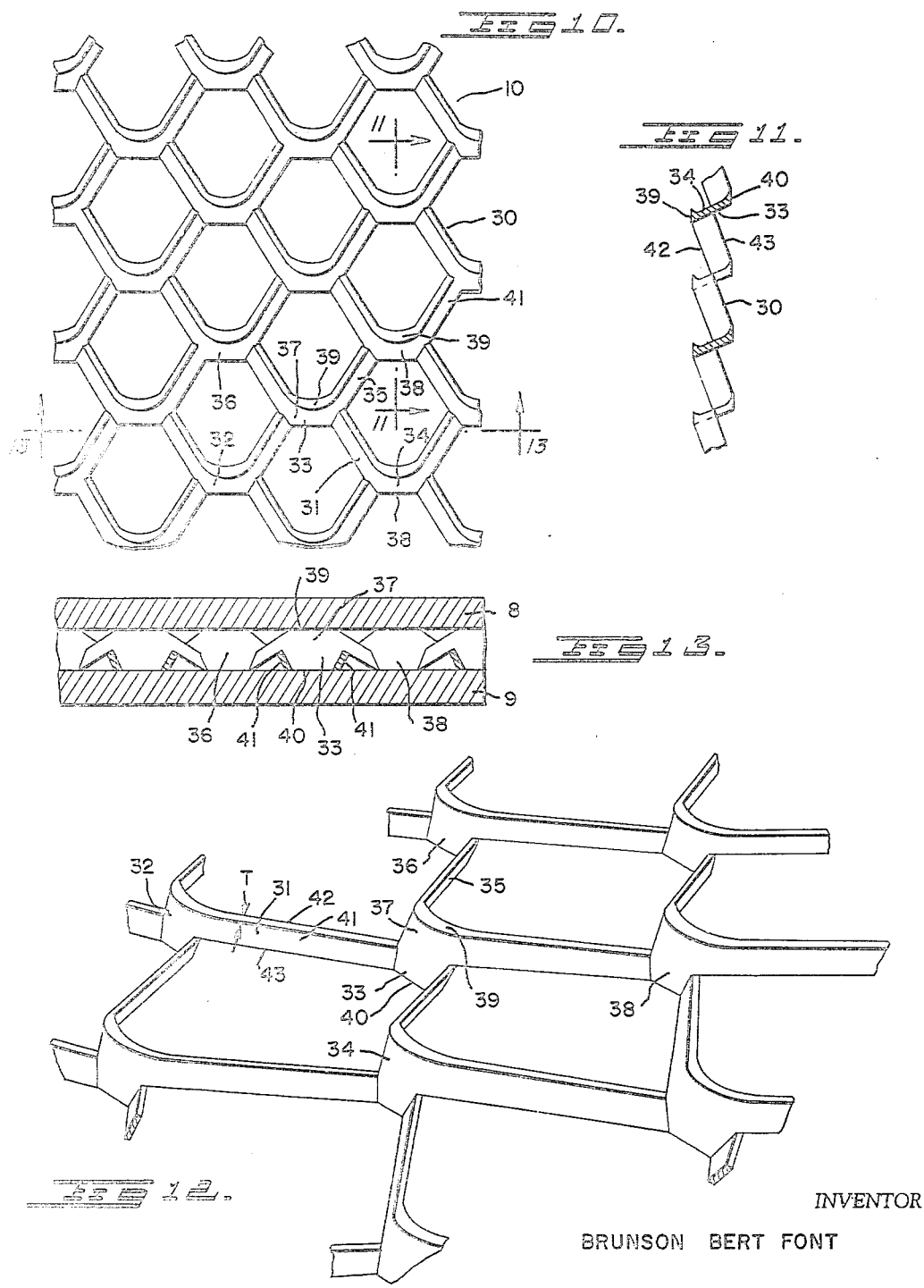

3,485,276
CHAIN SAW GUIDE BAR AND ITS
METHOD OF FABRICATION
Brunson Bert Font, Los Angeles, Calif., assignor to Mc-
Culloch Corporation, Los Angeles, Calif., a corporation of Wisconsin
Filed Sept. 20, 1966, Ser. No. 580,668
Int. Cl. B27b 17/02
U.S. Cl. 143—32       11 Claims

ABSTRACT OF THE DISCLOSURE

A chain saw guide bar including a foraminous core comprising a plurality of serpentine portions undulating between guide bar side plate members.

GENERAL BACKGROUND, OBJECTS AND SUMMARY OF INVENTION

This invention relates to an improved chain saw guide bar and a process for producing this bar.

The invention is particularly directed to a portable chain saw guide bar containing a foraminous core. This foraminous core includes a multi-directional pattern of core openings interspersed with a multi-directional pattern of anchoring points securing the core to panel members of the guide bar.

A variety of structures have been previously developed in an effort to produce an acceptable lightweight guide bar structure for a portable chain saw.

Some of these structures have included a core member fabricated of lightweight material such as a lightweight metal or plastic. Others have been fabricated so as to include a plurality of ducts extending generally normal of the longitudinal axis of the guide bar.

These prior art attempts to produce lightweight chain saw guide bars have produced structures where the bonds between the core and the panel members of the guide bars are vulnerable to breaking in response to flexing of the guide bar. Such flexing occurs during rough usage of a portable chain saw under field conditions.

In addition, these techniques at best constitute imperfect attempts to reduce the weight of chain saw guide bars in that unnecessary and excessive amounts of core material are employed. These excessive amounts of material, in addition to increasing fabricating cost and increasing the weight of a portable chain saw, require excessive bonding between the core and the panel members of the guide bar and thus make fabrication excessively difficult and expensive.

Recognizing the need for an improved lightweight chain saw guide bar, it is an object of the present invention to provide a new guide bar structure and a method for its manufacture which yield a structure lacking defects of previously developed guide bars such as those noted.

It is a particular object of the present invention to provide an improved lightweight chain saw guide bar which is uniquely capable of being flexed in multiple directions without rupturing the bonds between the guide bar core and panels between which it is sandwiched.

It is another basic object of the invention to provide an improved lightweight guide bar which is characterized by a foraminous core having a uniform pattern of openings which reduces weight of the guide bar to a maximum extent without sacrificing strength or flexibility.

It is likewise an object of the invention to provide such an improved guide bar structure which is characterized by ease and economy of fabrication.

A further object of the invention is to provide a process for fabricating a lightweight guide bar having a foraminous core, which process avoids the necessity for employing highly specialized fabrication techniques or materials.

A chain saw guide bar structure designed to accomplish principal objects of the invention is characterized by a pair of plate members between which is sandwiched a foraminous core or spacer member. This spacer member includes a plurality of portions spaced in at least one direction measured parallel to the plate members. These portions define a plurality of openings spaced in each of a plurality of mutually transverse directions measured parallel to the plate members.

An individually significant structural concept of the invention resides in the utilization of a spacer member which comprises a plurality of generally parallel, serpentine portions.

Other significant facets reside in a foraminous core member including serpentine portions which are interwoven together, or partially overlapping and unitized with the individual elements undulating transversely of the plate members.

Still another independently significant facet of the invention involves a core strucure wherein the serpentine portions have spaced, planar anchoring surfaces which are substantially coplanar with and bonded to the inner peripheries of the plate members of the guide bar.

A process presented through the invention entails the forming of a plurality of multi-directionally spaced, planar anchoring surfaces on each side of foraminous material. Bonding material is then deposited on the foraminous material and the foraminous material is sandwiched between the panel members of the guide bar. The panel members are bonded to the foraminous material, with the outer periphery of the foraminous material being recessed from the outer peripheries of the panel members to define a chain saw channel, and with the bonding being effected at the plurality of spaced anchoring surfaces.

In describing the invetion, reference will be made to a preferred apparatus and process embodiment shown in the appended drawings.

In the drawings:

FIGURE 1 is a schematic view, in elevation, of a representative portable chain saw upon which the improved guide bar of the present invention may be mounted;

FIGURE 2 is an enlarged view of the chain saw guide bar incorporated in the FIGURE 1 apparatus, illustrating by broken away portions of the guide bar, the sandwiched character of planar metallic plates and a foraminous woven wire core or spacer member of the guide bar;

FIGURE 3 provides a schematic and enlarged illustration of a portion of a preferred structure of the foraminous core of the FIGURE 2 guide bar, illustrating the woven character of wire-like components of this guide bar;

FIGURE 4 provides an enlarged transverse view of the FIGURE 2 guide bar illustrating the relation between the woven serpentine components of the foraminous core shown in FIGURE 3 with the plate-like outer members of the guide bar;

FIGURE 5 provides an enlarged transverse sectional view of the FIGURE 2 guide bar as viewed along the section line 5—5;

FIGURES 6 through 9 schematically illustrate a process for forming the guide bar of FIGURE 2, with FIGURE 6 illustrating the rolling of metallic woven wire mesh used as the foraminous core, with FIGURE 7 illustrating the electro deposition of a copper brazing compound on the rolled core, with FIGURE 8 illustrating the sandwiching of the core between the outer plates of the guide bar, and with FIGURE 9 illustrating the brazing of the plates to the guide bar core;

FIGURE 10 provides a plan view of an alternative guide bar core which is fabricated of expanded sheet metal;

FIGURE 11 provides a section view, in elevation, of a portion of the FIGURE 10 core as viewed along the section line 11—11;

FIGURE 12 provides a perspective view of the expanded metal guide bar core shown in FIGURE 10; and FIGURE 13 provides a transverse sectional view of a guide bar including the FIGURE 10 core, with the core being viewed in section along the section line 13—13 of FIGURE 10.

OVERALL STRUCTURE

FIGURE 1 schematically illustrates a portable chain saw 1 including a conventional motor housing 2, a conventional carrying handle 3, a unique lightweight guide bar 4, and a conventional chain 5.

Guide bar 4, in the usual fashion is connected to the motor housing 2. The chain 5, which carries a plurality of cutter elements 6, is mounted for sliding movement through a peripheral slot 7 formed in the outer periphery of the guide bar. In a conventional fashion, chain 5 is driven by a sprocket mounted on the housing 2 and driven by a motor contained within this housing.

FIGURE 2 schematically illustrates the basic structural characteristics of the guide bar 4. As there shown, guide bar 4 is fabricated from a pair of sheet steel plates 8 and 9 between which is sandwiched a foraminous core or spacer member 10. The outer periphery 11 of foraminous core 10 is spaced inwardly from the outer peripheries 12 and 13 respectively of sandwiching plates 8 and 9 so as to define the peripheral chain receiving slot 7.

Foraminous core 10 is preferably fabricated of woven mesh metal or expanded metal material which is characterized by open spaces extending transversely between the guide bar, with each open space having a width considerably in excess of the width of its adjacent, periphery defining portions.

STRUCTURAL DETAILS OF WOVEN MESH CORE

FIGURES 3, 4 and 5 illustrate structural details of the core 10 and the relation of the core 10 to the sandwiching plate members 8 and 9.

Core 10 is preferably fabricated of steel mesh and includes a first plurality of parallel, mutually independent, serpentine elements 14 and another plurality of parallel, mutually independent, serpentine elements 15. Elements 14 and 15 undulate transversely of the plate members 8 and 9 such that the median planes of symmetry 16 and 17 of members 14 and 15 respectively are perpendicular to the plates 8 and 9. As illustrated, members 14 are interwoven with the elements 15 and extend generally at right angles to the elements 15. Elements 14 and 15 are fabricated of the same wire stock and may have circular cross sections, as shown in FIGURE 4. As shown in FIGURE 2, elements 14 and 15 are preferably inclined, in opposite directions, at an angle of about forty-five degrees to the longitudinal axis of the guide bar 4. This inclination provides optimum strength characteristics and tends to prevent separation or displacement of the mesh elements.

For purposes of clarity of illustration, the thickness of the woven elements 14 and 15 in FIGURES 3 and 4 has been exaggerated. Preferably the thickness of each of these elements would be substantially less than the width of each open space 18, with these dimensions being measured parallel to the plates 8 and 9.

Elements 14 are mutually spaced, as are the elements 15. As a result of this spacing of the elements 14 and 15, a plurality of openings 18 are formed which are spaced in each of a plurality of mutually transverse directions measured parallel to the plate members 8 and 9. In other words, spaced openings 18 are repeated in a pattern running longitudinally of the guide bar 4 and also in a pattern running transversely of the guide bar 4.

Owing to the uniform nature of the woven mesh, foraminous core 4, the overall pattern of the openings is symmetrical and consistent.

The wire-like serpentine elements 14 and 15, which are mutually engaging as shown in FIGURE 4, undulate in a serpentine fashion back and forth between the inner peripheries, i.e., opposing faces, of the plate members 8 and 9. Thus, these elements hold the plate members spaced apart a distance which exceeds the normal diameter of the identically diametered members 14 and 15 as generally shown in FIGURE 4.

The core elements 14 are each provided with a plurality of longitudinally spaced anchoring surfaces 19. Similarly, each of the core elements 15 is provided with a plurality of longitudinally spaced and anchoring surfaces 20. Anchoring surfaces 20 may be generally oval and elongate in the longitudinal direction of their associated members 15 while anchoring surfaces 19 may be generally oval and generally elongate in the longitudinal direction of their respectively associated elements 14. The anchoring surfaces 19 and 20 are disposed on each side of each element 14 and 15 at the points of inflection of these elements.

Anchoring surfaces 20 and 19 facing the plate 9 are substantially coplanar with the inner surface 21 of the plate 9 while anchoring points 19 and 20 facing the plate 8 are substantially coplanar with the inner face 22 of this plate.

As shown in FIGURE 3, the anchoring surfaces 20 and 19 alternate so that in the longitudinal direction of either the elements 14 or the elements 15, the elongate axes of the anchoring points alternate in direction.

The anchoring surfaces 20 and 19 facing the plate surface 21 are bonded to this surface as by brazing while the anchoring points 20 and 19 facing the surface 22 are bonded as by brazing to this surface.

PROCESS OF MANUFACTURE OF GUIDE BAR WITH MESH CORE

FIGURES 6 through 9 illustrate the process which is employed to fabricate woven foraminous core 10.

As shown in FIGURE 6, conventional, heavy gauge, steel woven mesh 23 is passed between rollers 24 and 25. The gap between the rollers 24 and 25 is less than the initial thickness of the stock material 23. As a result, the material 23, in passing between the rollers 24 and 25, is sized within relatively close tolerances and in addition, the anchoring surfaces 19 and 20 are formed. Anchoring surfaces 19 and 20 are formed as a result of the compressive engagement of the rollers 24 and 25 with opposite sides of the stock material 23.

The rolled, stock material 23 is then subjected to an operation where copper brazing material is electrically deposited on its opposite sides. This may occur, for example as shown in FIGURE 7, in a conventional and schematically shown installation 26 comprising a housing within which copper brazing material is electrically deposited by conventional and widely used techniques.

At some point prior or subsequent to the electrical deposition of brazing material on the rolled mesh 23, the mesh is cut so as to provide the spacer or core layer 10 having the desired peripheral configuration. This peripheral configuration will ensure that the outer periphery 11 of the core terminates within the outer peripheries of the plate layers 8 and 9 so as to enable the formation of the chain receiving groove 7.

The correctly sized rolled and copped coated core 10 is sandwiched between platelike layers 8 and 9 as shown in FIGURE 8 and this resulting sandwich is disposed within a conventional brazing oven 27 as generally shown in FIGURE 9. Conventional and well recognized brazing techniques are then employed to effect the bonding of the copper coated core 10 to the sandwiching steel plate members 8 and 9.

The bonded panels and core are then secured to a motor housing such as the housing 2 shown in FIGURE 1 with conventional fasteners which pass through a bar slot 28 to clamp the bar against the housing periphery. Subsequently, a chain having cutter elements, such as the chain 5 shown in FIGURE 1, is mounted on the guide bar so that, in the usual fashion, chain guide fin portions project into slot 7 whereby the chain is slidably disposed on the guide bar periphery. Chain 5 is also disposed in conventional driven engagement with a sprocket which is carried on the housing 2, aligned with the slot 7, disposed adjacent recessed bar end 29, and driven by a motor contained within the housing.

STRUCTURAL DETAILS OF EXPANDED METAL CORE

FIGURES 10 through 13 illustrate structural details of an alternative core 10 which is fabricated from expanded metal.

As shown in FIGURES 10 through 13, the expanded metal version of the core 10 is fabricated of expanded sheet steel 30.

This expanded metal foraminous core, as shown with particular clarity in FIGURES 10 and 12, may be viewed as being characterized by a plurality of parallel, flat (cross-section), wire-like, serpentine portions with their planes of undulation being inclined between the plates 8 and 9. These serpentine portions are disposed in partially overlapping, unitized relation. Thus, as illustrated in FIGURES 10 and 12, one representation, flat wire-like, serpentine portion 31 undulates from a high point 32 down to a low point 33 and back to a high point 34. Another adjacent and representative, flat wire-like, serpentine portion 35 undulates from a low point 36 to a high point 37 and back to a low point 38. High point 37 of serpentine portion 35 is superposed and integral with low portion 33 of serpentine portion 31. Similarly, each high portion of each serpentine portion is superposed above, i.e., overlapping with, and integral with a low portion of an adjacent serpentine portion.

As will be apparent by reference to FIGURE 12, the median plane of undulation of the serpentine portion 31 is generally parallel to the median plane of undulation of the serpentine portion 35 as it is to all other similar serpentine portions of the grid 30. These parallel median planes of undulation are inclined to the plates 8 and 9.

Each of the superposed high and low portions of the foraminous grid 30 is provided with a planar anchoring or bonding surface which is bonded to and in coplanar relation with one of the sandwiching plates 8 or 9. Thus, high point 37 includes a planar, generally crescent shaped anchoring surface 39, while low point 33 includes a planar, generally crescent shaped anchoring surface 40 which is parallel but somewhat offset in relation to the anchoring point 39. As shown in FIGURE 13, anchoring surfaces 39 are disposed in parallel bonded engagement with the sandwiching plate 8, while anchoring surfaces 40 are disposed in parallel and bonded engagement with the plate 9.

On the side of the core 10 facing the plate member 8, the plurality of anchoring points 39 are coplanar and spaced in each of a plurality of directions. Thus, as shown in plan view in FIGURE 10, anchoring points 39 are disposed in a pattern characterized by horizontal spacing both from left to right and top to bottom of the FIGURE 10 view.

As will be appreciated, the planar bonding points 40 are disposed in a similar coplanar, multidirectional spaced pattern on the side of the core 10 in engagement with the plate member 9.

As will be apparent by reference to FIGURE 12, each anchoring point 39 of each serpentine portion is connected with the adjacent anchoring point 40 of this serpentine portion by an inclined web-like segment 41 having a generally rectangular cross-section. The edges 42 and 43 of each web 41 are generally parallel and inclined relative to the plates 8 and 9. The thickness T of each web 41 is the smallest dimension of the rectangular cross-section and extends generally between, but somewhat inclined to, the plates 8 and 9.

PROCESS OF MANUFACTURE OF GUIDE BAR WITH EXPANDED METAL CORE

As may be appreciated, conventionally supplied expanded sheet metal lacks the spaced, planar anchoring spaces 39 and 40. These coplanar and multidirectionally spaced anchoring surfaces may be formed by sanding, i.e., abrading expanded metal stock on each of the opposite sides of the expanded metal. Conventional sanders for forming planar surfaces may be used for this purpose.

Subsequent to the forming of these planar surfaces the guide bar fabricating steps described in conjunction with FIGURES 7, 8 and 9 are employed.

ADVANTAGES

A prime advantage of the processes of manufacturing previously disclosed resides in their employment of conventional fabricating techniques. Thus, without resorting to highly specialized equipment, or complex jigs for positioning multiple components of a core, a structurally rugged but lightweight guide bar for a chain saw is efficiently produced.

Significantly, these processes enable the employment of foraminous materials such as woven wire mesh or expanded sheet metal to be effectively utilized as a core for a guide bar. This utilization is unexpected in view of the irregular character of conventional stock woven mesh and expanded metal and their structural characteristics which would lead one to doubt that an effective bond could be produced between a spacer member fabricated of these materials and sheet metal sandwiching plates.

A unique and particularly significant advantage attributable to the resultant guide bar is its extreme lightweight coupled with unusual structural ruggedness. The bar may be subjected to rough field usage which would induce flexing without disrupting the effective bond between the spacer or core member and the sandwiching panels. Significantly, this resistance to the breakage of the spacer bond is maintained even though the guide bar may be flexed in different directions.

The resistance to bond rupturing is believed to substantially result from the plurality of relatively small bonding spots which are distributed on multidirectional, pattern over the guide bar core. To some degree this improved bond may result from the alternating arrangement of the elongate axes of the oval and coplanar bonding surfaces existing on each side of the woven mesh guide bar core. The crescent bonding surfaces of the expanded metal, in essence, unitize these elongate surfaces in a generally U-shaped pattern.

It is also believed that the unique ruggedness of the guide bar, and resistance to damage when subjected to bending, results from the ability of the core material to distort in its own plane. Such planar distortion is a consequence of foraminous material such as woven mesh or expanded sheet. The woven, independent elements of the mesh and the planar surface connecting webs of the expanded metal serve to effectively relieve and distribute stress across the guide bar core and between the core sandwiching plates.

Also significant is the basically low cost of the resultant guide bar since it may be fabricated from readily available and relatively economical materials.

The periphery 11 of the guide bar core is defined by a cut surface of the wire mesh. The irregular periphery thus produced may be advantageous in serving to effectively retain lubricant material so as to facilitate the sliding movement of the chain throughout the guide bar slot.

The cut edge of either the wire mesh core 10 or the expanded metal core 10 will produce an irregular edge. As will be appreciated, the discontinuities of the cut edge of either form of the core 10 will provide pockets spaced along the base of slot 7. These pockets may advantageously tend to retain lubricant in the slot 7 which might otherwise tend to be swept out by the guide fins of the chain 5 which project into the slot 7.

In describing the invention reference has been made to preferred articles and process embodiments. However, those skilled in the art and familiar with this disclosure may well recognize additions, deletions, substitutions or other modifications which would fall within the purview of the invention as defined in the appended claims.

I claim:
1. A chain saw guide bar comprising:
a pair of plate members; and
a foraminous spacer member,
said spacer member including a plurality of portions spaced in at least one direction measured parallel to said plate members, and
said portions defining a plurality of openings spaced in each of a plurality of mutually transverse directions measured parallel to said plate members;
said portions of said spacer member comprising a plurality of generally parallel, serpentine portions.

2. A chain saw guide bar comprising:
a pair of plate members; and
a foraminous spacer member,
said spacer member including a plurality of portions spaced in at least one direction measured parallel to said plate members, and
said portions defining a plurality of openings spaced in each of a plurality of mutually transverse directions measured parallel to said plate members;
said portions of said spacer member including one plurality of mutually independent parallel and spaced elements extending in one direction diagonally of the longitudinal axis of said guide bar and another plurality of mutually independent parallel and spaced elements extending in another direction diagonally of the longitudinal axis of said guide bar;
said one and said other plurality of elements undulating transversely of said plate members and having median planes of symmetry perpendicular to said plate members; and
said elements being bonded to said plate members.

3. A chain saw guide bar comprising:
a pair of plate members; and
a foraminous spacer member,
said spacer member including a plurality of portions spaced in at least one direction measured parallel to said plate members, and
said portions defining a plurality of openings spaced in each of a plurality of mutually transverse directions measured parallel to said plate members;
said spacer member comprising rolled, woven, wire mesh, with woven serpentine elements thereof each having spaced, planar anchoring surfaces substantially coplanar with and bonded to the inner peripheries of said plate members; and
a cut, peripheral edge of said spacer member defining the base of a guide slot adapted to slidably receive a chain saw.

4. A chain saw guide bar as described in claim 1:
wherein said plurality of partially superposed parallel, serpentine portions are defined by expanded metal;
wherein said portions undulate transversely of said plate members and have median planes of symmetry inclined relative to said plate members; and
wherein said serpentine portions are bonded to said plate members.

5. A chain saw guide bar as described in claim 1:
wherein said partially superposed serpentine portions each have spaced, planar anchoring surfaces substantially coplanar with and bonded to the inner peripheries of said plate members; and
wherein a cut, peripheral edge of said spacer member defines the base of a guide slot adapted to slidably receive a chain saw.

6. A chain saw guide bar comprising:
a pair of plate members; and
a spacer member including:
wire-like portions engaging said plate members to hold said plate members apart a distance exceeding the thickness of said wire-like portions measured normal to said plate members,
some of said wire-like portions being at least partially displaced in one direction parallel to said plate members to define a pattern of spaced openings extending in each of a plurality of mutually transverse directions and having width measured parallel to said plates exceeding the width of said wire-like portions measured parallel to said plates, and
said wire-like portions providing a plurality of anchoring spots bonded to said plate members, with said anchoring spots being spaced so as to define a pattern of spaced anchoring spots extending in each of a plurality of mutually transverse directions.

7. A chain saw guide bar as described in claim 6 wherein said portions of said spacer member comprise a plurality of generally parallel, serpentine portions.

8. A chain saw guide bar as described in claim 7:
wherein said plurality of serpentine elements includes one plurality of mutually independent parallel elements extending in one direction and another plurality of mutually independent parallel elements extending in another direction;
wherein said one and said other plurality of serpentine elements are mutually interwoven at right angles and undulate transversely of said plate members and have median planes of symmetry perpendicular to said plate members; and
wherein said serpentine elements are bonded to said plate members.

9. A chain saw guide bar as described in claim 8:
wherein said spacer member comprises rolled, woven, wire mesh, with woven serpentine elements thereof each having spaced, planar, generally oval anchoring surfaces substantially coplanar with and bonded to the inner peripheries of said plate members;
wherein the peripheral edge of said spacer member defines the base of a guide slot adapted to slidably receive a chain saw; and
wherein said generally oval anchoring surfaces adjacent each anchoring plate alternate in orientation in a plurality of directions.

10. A chain saw guide bar as described in claim 7:
wherein said plurality of serpentine portions comprise partially superposed, integrally connected portions of expanded sheet metal;
wherein said serpentine portions undulate transversely of said plate members and have median planes of symmetry inclined relative to said plate members; and wherein said serpentine portions are bonded to said plate members.

11. A chain saw guide bar as described in claim 6:

wherein said spacer member comprises expanded sheet metal, having partially superposed serpentine portions, each having spaced, planar, generally elongate crescent-shaped anchoring surfaces substantially coplanar with and bonded to the inner peripheries of said plate members;

wherein a cut peripheral edge of said spacer member defines the base of a guide slot adapted to slidably receive a chain saw; and wherein said generally elongate, crescent shaped anchoring surfaces adjacent one anchoring plate are connected to elongate anchoring surfaces adjacent the other plate by webs having generally parallel edges inclined relative to said plates and a rectangular cross section, the smaller dimension of which extends generally between said plates.

References Cited

UNITED STATES PATENTS 2,481,046  9/1949  Scurlock _____ 29—463
2,774,395  12/1956  Tweedie _____ 143—32

FOREIGN PATENTS 626,681  9/1961  Canada.

DONALD R. SCHRAN, Primary Examiner